United States Patent [19]
Cummings et al.

[11] Patent Number: 5,827,451
[45] Date of Patent: Oct. 27, 1998

[54] MICROEMULSION USEFUL AS RINSE AID

[75] Inventors: Wayne J. Cummings, Columbus; Robert D. Pifer, Westchester; Frank H. Stevens, Columbus, all of Ohio

[73] Assignee: Witco Corporation, Greenwich, Conn.

[21] Appl. No.: 32,685

[22] Filed: Mar. 17, 1993

[51] Int. Cl.$^6$ .................... B01J 13/00; C11D 3/00
[52] U.S. Cl. .............. 252/312; 510/189; 510/242; 510/364; 510/417; 510/525
[58] Field of Search .................. 252/312, 542, 252/547, 548, 174.21, 174.22; 510/189, 364, 417, 421, 433, 514, 525, 242

[56] References Cited

U.S. PATENT DOCUMENTS

| | | | |
|---|---|---|---|
| 3,440,063 | 4/1969 | Chestochowski et al. | 427/331 |
| 3,883,356 | 5/1975 | Syrovatka et al. | 252/312 |
| 3,974,076 | 8/1976 | Wiersema et al. | 252/8.8 |
| 4,076,632 | 2/1978 | Davis | 252/8.8 |
| 4,233,164 | 11/1980 | Davis | 252/8.8 |
| 4,284,435 | 8/1981 | Fox | 134/2 |
| 4,434,062 | 2/1984 | Oswald et al. | 166/274 |
| 5,240,562 | 8/1993 | Phan et al. | 162/158 |
| 5,389,282 | 2/1995 | Saijo et al. | 510/416 |
| 5,391,325 | 2/1995 | Swenson et al. | 252/547 |
| 5,522,942 | 6/1996 | Graubart et al. | 252/548 |

FOREIGN PATENT DOCUMENTS

| | | |
|---|---|---|
| 0 003 775 | 9/1979 | European Pat. Off. . |
| 0003775 | 9/1979 | European Pat. Off. . |
| 0421146 | 4/1991 | European Pat. Off. . |
| 039 30 028 | 3/1991 | Germany ............ 252/547 |
| 3930028 | 3/1991 | Germany . |
| 0077 289 | 11/1973 | Japan ............ 252/547 |

OTHER PUBLICATIONS

Rompp Chemie Lexikon, (George Thieme Verlag Stuttgart, NY, NY, 1989*) p. 536.
Database Registry on STN, CN ethanol, 2–butyoxy–(8CI, 9CI) CA Index Name, RN — 111–76–2, 1997.
Milton J. Rosen, Surfactants and Interfacial Phenomena, (John Wiley& Sons, NY, NY) (Copyright, 1978).

*Primary Examiner*—Richard D. Lovering
*Assistant Examiner*—Daniel S. Metzmaier
*Attorney, Agent, or Firm*—Edward K. Welch II; Timothy X. Witkowski; Andrew S. Reiskind

[57] ABSTRACT

Disclosed are isotropic oil-in-water microemulsions containing an oil component of a fatty acid, fatty alcohol, or ester thereof; a quaternary ammonium component; an ether component; and water. The microemulsions are useful to apply removable hydrophobic films to a surface, rendering them useful in e.g. carwashes.

13 Claims, No Drawings

MICROEMULSION USEFUL AS RINSE AID

The present invention relates to rinse aids and compositions useful in formulating rinse aids, particularly for large-scale commercial and industrial applications.

Rinse aids are usually applied to a large surface to assist drying of the surface. The rinse aid formulation spreads over the surface and causes water that is present to bead up on the surface so that the surface may be more quickly blown dry. The formulation containing the rinse aid acts, in effect, as a short-term water repellent film on the surface; the hydrophobic nature of the film induces water present on the surface to bead up or to sheet, and to be more easily removed.

The properties of rinse aids are thus manifestly advantageous to applications such as commercial car washes. However, conventional rinse aid formulations have contained components which for a variety of reasons have become relatively undesirable. For instance, formulations have contained relatively volatile components, such as ethylene glycol monobutyl ether (also known as butyl cellosolve), but such volatile organic components are now considered undesirable as contributors to atmospheric pollution. Indeed, an ever-developing body of governmental environmental controls has sought to reduce or even eliminate the emission of volatile organic components into the atmosphere, with obvious detrimental effect on the manufacture and use of conventional rinse aid formulations. In addition, conventional rinse aid formulations have tended to contain hydrocarbon oils to enhance the hydrophobicity of the rinse aid; however, such oils have increasingly fallen from favor as they collect in the waste water generated by the car wash or other site using the rinse aid, thereby contributing undesirably to the disposal and treatment of the waste water generated at the site. Such oils, which have conventionally included mineral seal oil or other hydrocarbon mineral oils, are also found to be relatively undegradable, thereby further contributing to the environmental burden.

Alleviating the foregoing problems of conventional rinse aid formulations is far from straightforward, however, because of the balance of properties that must be realized if any new rinse aid formulation is to find success in practical application. That is, the rinse aid must not only reduce the environmental risks as outlined above, but must also promote the rapid formation of a relatively hydrophobic surface, thereby promoting the desired beading and sheeting to promote the removal of water.

In addition, the rinse aid formulation must not cause any loss of sheen or luster on the surface being treated, must not form any sort of visible deposit or smear, and advantageously should contribute to a highly lustrous, shiny-looking surface when the beaded water has been removed. As may be appreciated, components that may contribute to a rinse aid formulation in one aspect, may be all too likely to detract from other properties of the rinse aid formulation such as translucency or transparency, as the case may be, or ease of dilution in water. This difficulty of formulation is, of course, pronounced because of the possibility that components of the formulation may interact in unforeseen ways.

Thus, there remains a need for a rinse aid formulation which meets all of the foregoing objectives without detracting from the desired high quality of performance.

BRIEF SUMMARY OF THE INVENTION

Briefly stated, one aspect of the present invention comprises:
an isotropic oil-in-water microemulsion comprising
(a) an oil component of the formula $A_1$–$OA_2$ wherein
$A_1$ is selected from the group consisting of saturated and unsaturated, linear and branched, fatty acyl groups containing 12 to 22 carbon atoms, and $A_2$ is selected from the group consisting of hydrogen, alkyl containing 1 to 4 carbon atoms, glyceryl residues of the formula $C_3O_2H_7$, —$CH_2CH_2OH$, and —$(CH_2CH_2O)_{1-10}H$ or $A_1$ is hydrogen or straight or branched acyl containing 1 to 4 carbon atoms and $A_2$ is straight or branched alkyl or alkylene containing 12 to 22 carbon atoms;
(b) a quaternary ammonium component selected from the group consisting of (i) compounds of the formula $(R_1)(R_2)N^+(R_3)(R_4)X^-$ wherein
$R_1$ is straight or branched alkyl containing 1 to 4 carbon atoms;
$R_2$ and $R_3$ are independently selected from the group consisting of straight or branched alkyl and alkenyl groups containing up to 22 carbon atoms which are optionally substituted with hydroxy, and $HOCH_2CH_2(OCH_2CH_2)_{1-10}$—; and
$R_4$ is alkyl or alkenyl containing 8 to 22 carbon atoms, benzyl, alkyl, alkoxyalkyl containing a total of 8 to 22 carbon atoms, or —$(CH_2)_{1-3}$—$.N^+(CH_3)_3X^-$; and (ii) compounds of the formula

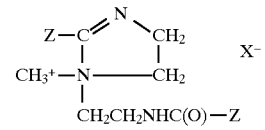

wherein Z is straight or branched, saturated or unsaturated alkyl containing 12 to 18 carbon atoms; and
X is an organic or inorganic anion;
(c) an ether component of the formula

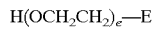

wherein e is 1 to 10 and E is straight or branched alkoxy containing 1 to 4 carbon atoms;
and (d) water.

Another aspect of the present invention is the method of increasing the hydrophobicity of a surface by applying to the surface the microemulsion described herein in an amount effective to form a hydrophobic film on said surface. The invention is effective to form a hydrophobic film on both high energy and low energy surfaces, comprising particularly surfaces which are coated with organic polymeric materials, e.g. paints and pigments and mixtures thereof, oxides and metal surfaces of high and low specific energies as can be determined by contact angle measurements quite accurately.

DETAILED DESCRIPTION OF THE INVENTION

One component of the microemulsion of the present invention, termed herein the "oil component", is preferably one or more saturated or unsaturated, linear or branched, fatty acid containing 12 to 22 carbon atoms. Among the useful fatty acids include lauric, myristic, palmitic, palmitoleic, stearic, oleic, linoleic, linolenic, ricinoleic, gadoleic, arachidonic, behenic, cetoleic, and erucic acids.

Other compounds useful as the oil component include lower alkyl, that is, $C_1$ to $C_4$ alkyl, esters of saturated and unsaturated, linear and branched, fatty acids containing 12 to 22 carbon atoms.

Preferred esters are the methyl esters of any of the fatty acids disclosed herein. Notably, the fatty acids are "natural" fatty acids, by which is meant that they can be derived from naturally occurring vegetable or animal sources. In this way, the composition of the present invention is environmentally compatible in not requiring the use of materials which must be derived from petroleum-based sources. Particularly preferred examples of useful oil components include methyl oleate, methyl stearate and methyl tallowate.

Other esters useful as the oil component include glyceryl esters of fatty acids, formed by esterification of one or more fatty acids with glycerine ($HOCH_2$—$CHOH$—$CH_2OH$). The monoesters are preferred. Yet other esters include esters of one or more fatty acids with ethylene glycol ($HOCH_2CH_2OH$) or with poly(ethylene oxide), e.g. $HO(CH_2CH_2O)_{1-10}H$.

Also contemplated for use as the oil component are fatty alcohols, e.g. alcohols containing 12 to 22 carbon atoms which are saturated or unsaturated, and esters thereof whose acyl components preferably contain 1 to 4 carbon atoms. The esters would have the formula $H(CH_2)_{0-3}C(O)O$—$A_2$ wherein $A_2$ is the fatty alcohol residue.

It will be understood that when natural sources are employed for the oil component, the fatty acid, fatty alcohol and/or the esters thereof can comprise a plurality of fatty moieties of different chain lengths, without departing from the present invention. For instance, fatty acids and fatty alcohols derived from the coconut generally have a variety of chain lengths, generally ranging from 8 to 18 carbon atoms in length. Similarly, fatty acids and alcohols derived from tallow generally contain 14 to 18 carbon atoms.

Notably, the microemulsions of the present invention are preferably free of hydrocarbon oils and mineral oils, by which is meant liquid alkanes including those which are linear, branched, and mixtures thereof.

The microemulsions of the present invention also contain a quaternary ammonium component, which comprises one or more compounds of the general formula $(R_1)(R_2)N^+(R_3)(R_4)X^-$ described above. Preferred quaternary ammonium compounds include:

(a) those of the formula $N^+(CH_3)_3Q^1 \cdot X^-$ wherein $Q^1$ is a straight or branched $C_{12}$–$C_{22}$ alkyl or alkylene chain, allyl, or benzyl, or $Q^1$ has the formula $Q^2$—O—$(CH_2)_3$— wherein $Q^2$ is straight or branched alkyl containing 4 to 18 carbon atoms (such as soya-, hydrogenated tallow-, palmityl-, coco-, tallow-, palmityl-, and benzyl-trimethylammonium chloride, available from Witco Corporation, formerly Sherex Chemical Company, under the names ADOGEN 415, ADOGEN 1 441, ADOGEN 444, ADOGEN 461, ADOGEN 471, VARIQUAT E228, VARIQUAT E290, and VARIQUAT B200);

(b) those of the formula $CH_3N^+(Q^3)_3.X^-$ wherein each $Q^3$ is independently straight or branched alkyl containing 8 to 18 carbon atoms, such as methyltri($C_8$–$C_{10}$) ammonium chloride (available from Witco Corporation, formerly Sherex Chemical Company, under the name ADOGEN 464);

(c) dimethyl alkyl benzyl quaternaries of the formula $Q^4N^+(CH_3)_2BZ.X^-$ wherein BZ represents benzyl and $Q^4$ is straight or branched alkyl containing 12 to 18 carbon atoms (available from Witco Corporation, formerly Sherex Chemical Company, under the names VARIQUAT B345, VARIQUAT 50MC, VARIQUAT 80MC, VARIQUAT 50ME, VARIQUAT 80ME, VARIQUAT LC80, VARIQUAT 60LC, VARISOFT SDC, and VARISOFT SDC-W);

(d) diquaternaries of the formula $Q^5$—$N^+(CH_3)_2$—$(CH_2)_3$—$N^+(CH_3)_3.X^-_2$, wherein $Q^5$ is straight or branched alkyl or alkenyl containing 12 to 22 carbon atoms, such as N-tallow pentamethyl propane diammonium chloride (available from Witco Corporation, formerly Sherex Chemical Company, under the name ADOGEN 477);

(e) imidazolinium quaternaries such as methyl-1-hydrogenated tallow amido ethyl-2-hydrogenated tallow imidazolinium methylsulfate, methyl-1-tallow amidoethyl-2-tallow imidazolinium methylsulfate, methyl-1-oleyl amido ethyl-2-oleyl imidazolinium methylsulfate, and 1-ethylene-bis(2-tallow,1-methyl-imidazolinium methylsulfate) (available from Witco Corporation, formerly Sherex Chemical Company, under the names, respectively, VARISOFT 445, VARISOFT 475, VARISOFT 3690, and VARISOFT 6112);

(f) dialkyl dimethyl quaternaries of the formula $(CH_3)_2N^+(Q^6)_2.X^-$ wherein each $Q^6$ is straight or branched alkyl or alkenyl containing 8 to 22 carbon atoms, such as di $(C_{12}$–$C_{18})$ alkyl dimethyl-, dicoco dimethyl-and ditallow dimethyl-ammonium chloride (available from Witco Corporation, formerly Sherex Chemical Company, under the names ADOGEN 432, ADOGEN 462, VARIQUAT K300, and ADOGEN 470);

(g) methyl dialkoxy alkyl quaternaries of the formula $CH_3N^+Q^7(Q^8)_2 .X^-$ wherein $Q^7$ is straight or branched alkyl or alkylene containing 8 to 18 carbon atoms and each $Q^8$ is independently 2-hydroxyethyl or polyethoxyethanol containing 1 to 10 repeating ethoxy units, including methyl bis(2-hydroxyethyl) coco ammonium chloride, ethyl bis(polyethoxyethanol) alkyl ammonium ethyl sulfate, and methyl bis (polyethoxyethanol) alkyl ammonium chloride (available from Witco Corporation, formerly Sherex Chemical Company, under the names VARIQUAT 638, VARSTAT 66 and VARIQUAT K-1215);

(h) diamidoamine-based quaternaries such as methyl-bis-tallowamidoethyl)2-hydroxyethyl ammonium methylsulfate, methyl-bis(oleyl amidoethyl)-2-hydroxyethyl ammonium methylsulfate, and methyl bis(tallowamidoethyl)-2-hydroxypropyl ammonium methylsulfate (available from Witco Corporation, formerly Sherex Chemical Company, under the names VARISOFT 222, VARISOFT 222-LT, and VARISOFT 238);

(i) dialkylmethylbenzyl quaternaries of the general formula $CH_3N^+(Q^9)_2BZ, .X^-$ wherein BZ represent benzyl and each $Q^9$ is independently straight or branched alkyl or alkenyl containing 12 to 22 carbon atoms, such as dihydrogenated tallow methylbenzyl ammonium chloride (available from Witco Corporation, formerly Sherex Chemical Company, under the name VARIQUAT B-343).

The quaternary ammonium component can typically contain a range of chain lengths when the long-chain moiety is derived from a naturally occurring source such as the coconut or tallow. In the foregoing formula, X denotes any organic or inorganic anion which does not destabilize the microemulsion and which is inert to any surface to which the microemulsion is applied. Preferred anions include chloride, sulfate, acetate, propionate, formate, gluconate, methyl sulfate and ethyl sulfate.

The microemulsions of the present invention also contain an ether component, which preferably has the formula $H(OCH_2CH_2)_e$—E wherein e is 1 to 10, and E is straight or branched alkoxy containing 1 to 4 carbon atoms. The ether component assists in suspending and spreading the oil component in the microemulsion. A preferred example is that generically known as PEG dimethylether, available commercially from WITCO Corporation, (previously Sherex Chemical Company) under the name "VARONIC DM-55".

The microemulsions of the present invention also comprise water.

The microemulsions of the present invention are advantageously manufactured in relatively concentrated form, which are sold as such to formulators who then reformulate the concentrate into water in a more dilute form comprising about 1% or less of the concentrate, in which form it is then used. In the concentrate form, the microemulsions of the present invention typically comprise about 10 wt % to about 25 wt % of the oil component, about 10 wt % to about 25 wt % of the quaternary ammonium component, about 3 wt % to about 15 wt % of the ether component, and about 50 wt % to about 75 wt % water. Dilution produces a product, useful as a rinse aid, generally comprising about 0.5 to about 2.5 wt. % of the oil component, about 0.5 to about 2.5 wt. % of the quaternary ammonium component, about 0.1 to about 1.5 wt. % of the ether component, and the water. Preferably, the water in the diluted product comprises about 93.5 wt. % to about 98.9 wt. % thereof.

The concentrated microemulsion is readily prepared by combining the indicated ingredients, and subjecting the combination to high shear agitation effective to establish a stable microemulsion. It is preferred that the oil component be selected such that the microemulsion can readily be formed and such that the concentrate upon formation is transparent or translucent and not hazy. The clarity of the microemulsion contributes to the aesthetic attractiveness of the product before use and after application to the surface which is to be rendered hydrophobic, and also indicates the longer stability of the microemulsion. The microemulsion is characterized by clarity, stability (by which is meant resistance to separate into noticably separated aqueous and non-aqueous phases), and by relatively low polydispersity. In addition, the microemulsion can readily be diluted with tap water to form a more dilute form, which may undergo some loss of clarity.

The desired microemulsions are isotropic, clear or translucent, and thermodynamically stable dispersions of oil, water, emulsifier (the quaternary ammonium component), and the ether component (which can be thought of as a cosurfactant or coupling agent). The characteristics of microemulsions are well recognized in the art, as described further in Schulman et al., J. Phys. Chem. 63, 1677 (1959) and Friberg, Adv. Colloid Interface Sci. 4, 21 (1975). The droplet diameters in these microemulsions preferably range from about 100 to about 1000 Angstroms; the attainment of the desired particle size can be ascertained by techniques familiar to those of ordinary skill in this art. The interfacial composition, determined by the alkyl chain length of the oil and ether (cosurfactant) components, strongly influences distribution of the cosurfactant and the oil in the water phase.

Examples of rinse aid concentrate formulations within the scope of the present invention include the following:

| COMPONENT | AMOUNT (wt %) |
|---|---|
| COMPOSITION A | |
| Water | 67.0 |
| Dicoco dimethyl ammonium chloride | 9.0 |
| Methyl bis(2-hydroxyethyl) coco ammonium chloride | 9.0 |
| PEG-7 dimethyl ether* | 4.0 |
| Methyl oleate/methyl stearate blend | 11.0 |
| COMPOSITION B | |
| Water | 56.0 |
| Dicoco dimethyl ammonium chloride | 15.0 |
| Butyl cellosolve | 11.0 |
| Methyl Tallowate | 18.0 |
| COMPOSITION C | |
| Water | 56.0 |
| Dicoco dimethyl ammonium chloride | 15.0 |
| Butyl cellosolve | 11.0 |
| Methyl Oleate/Methyl stearate blend | 18.0 |

*-"VARONIC DM-55", WITCO Chemical Company (formerly Sherex Chemical Company)

Concentrates having each of the foregoing compositions were diluted to about one ounce of concentrate per gallon of water, and then used as the rinse aid in a conventional car wash installation. The metal surfaces of the cars to which this rinse aid was applied achieved a relatively lustrous, shiny appearance and were characterized in that residual rinse water on the surface beaded up and was easy to remove by blow drying and light toweling.

It will be, of course, appreciated that surfaces to which the present invention can be applied include metal as well as any other non-absorptive surfaces such as plastic, glass, fiberglass and substrates to which a hard surface such as enamel or other hard, water-repellent coating has been applied.

What is claimed is:

1. An isotropic oil-in-water microemulsion consisting essentially of:
   (a) from about 10 wt % to about 25 wt % of an oil component of the formula $A_1$–$OA_2$ wherein (i) $A_1$ is selected from the group consisting of saturated and unsaturated, linear and branched, fatty acyl groups containing 12 to 22 carbon atoms, and $A_2$ is selected from the group consisting of hydrogen, methyl, ethyl, propyl, isopropyl, and glyceryl residues of the formula —$C_3O_2H_7$, —$CH_2CH_2OH$, and —$(CH_2CH_2O)_{1-10}H$; or (ii) $A_1$ is hydrogen or branched acyl containing 1 to 4 carbon atoms and $A_2$ is straight or branched alkyl or alkenylene containing 12 to 22 carbon atoms;
   (b) from about 10 wt % to about 25 wt % of a quaternary ammonium component selected from the group consisting of (i) compounds of the formula $(R_1)(R_2)N^+(R_3)(R_4)X^-$ wherein
   $R_1$ is straight or branched alkyl containing 1 to 4 carbon atoms;
   $R_2$ and $R_3$ are each independently $HOCH_2CH_2(OCH_2CH_2)_{1-10}$— or an alkyl or alkenyl group having linear or branched structure containing up to 22 carbon atoms which is optionally substituted with hydroxy; and
   $R_4$ is alkyl or alkenyl containing 8 to 22 carbon atoms, benzyl, allyl, alkoxyalkyl containing 8 to 22 carbon atoms, or $X^-N^+(CH_3)_3$—$(CH_2)_{1-3}$—; and (ii) compounds of the formula

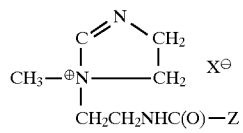

wherein Z is straight or branched, saturated or unsaturated alkyl containing 12 to 18 carbon atoms; and $X^-$ is an organic or inorganic anion;

(c) from about 3 wt % to about 15 wt % of an ether component of the formula $H(OCH_2CH_2)_e$—E
wherein e is 1 to 10 and E is straight or branched alkoxy containing 1 to 4 carbon atoms; and (d) from about 50 wt % to about 75 wt % water.

2. An isotropic oil-in-water microemulsion according to claim 1 wherein $A_2$ is methyl.

3. A microemulsion according to claim 1 wherein said quaternary ammonium component is dimethyl dicoco ammonium chloride.

4. A microemulsion according to claim 1 wherein said quaternary ammonium component is methyl-bis (2-hydroxyethyl) coco ammonium chloride.

5. A microemulsion according to claim 1 wherein said oil component is methyl oleate.

6. A microemulsion according to claim 1 wherein said oil component is methyl tallowate.

7. A microemulsion according to claim 1 wherein said oil component is methyl stearate.

8. An oil-in-water microemulsion according to claim 1 consisting of 0.5 about 0.5% wt. % to about 2.5 wt. % of said oil component, about 0.5 wt. % to about 2.5 wt. % of said quaternary ammonium component, about 0.1 wt. % to about 1.5 wt. % of said ether component, and water.

9. A microemulsion according to claim 8 wherein said quaternary ammonium component is dimethyl dicoco ammonium chloride.

10. A microemulsion according to claim 8 wherein said quaternary ammonium component is methyl-bis (2-hydroxyethyl) coco ammonium chloride.

11. A microemulsion according to claim 8 wherein said oil component is methyl oleate.

12. A microemulsion according to claim 8 wherein said oil component is methyl tallowate.

13. A microemulsion according to claim 8 wherein said oil component is methyl stearate.

* * * * *